(12) United States Patent
Kim et al.

(10) Patent No.: US 12,531,725 B2
(45) Date of Patent: Jan. 20, 2026

(54) ELECTRONIC DEVICE FOR GENERATING PASSWORD AND METHODS THEREOF

(71) Applicant: CRYPTO LAB INC., Seoul (KR)

(72) Inventors: Sohee Kim, Incheon (KR); Gun Jun Lee, Incheon (KR); Sung Hee Hong, Gwangmyeong-si (KR); Jeongdae Hong, Seoul (KR); Sulgi Kim, Seoul (KR); Garam Lee, Seoul (KR)

(73) Assignee: CRYPTO LAB INC., Seoul (KR)

( * ) Notice: Subject to any disclaimer, the term of this patent is extended or adjusted under 35 U.S.C. 154(b) by 27 days.

(21) Appl. No.: 18/805,693

(22) Filed: Aug. 15, 2024

(65) Prior Publication Data

US 2025/0119282 A1   Apr. 10, 2025

(30) Foreign Application Priority Data

Aug. 16, 2023   (KR) .................. 10-2023-0106735
Aug. 1, 2024    (KR) .................. 10-2024-0102314

(51) Int. Cl.
*H04L 9/08* (2006.01)
*H04L 9/00* (2022.01)

(52) U.S. Cl.
CPC ............ *H04L 9/0863* (2013.01); *H04L 9/008* (2013.01)

(58) Field of Classification Search
CPC ..... H04L 9/0863; H04L 9/008; H04L 9/0861; G06N 3/0475
See application file for complete search history.

(56) References Cited

U.S. PATENT DOCUMENTS

| | | | | |
|---|---|---|---|---|
| 10,397,207 B1* | 8/2019 | Huynh | ................ | H04L 9/0863 |
| 10,469,262 B1* | 11/2019 | Schroeder | ............ | H04L 63/123 |
| 10,742,634 B1* | 8/2020 | Shahbazi | ............. | H04W 12/77 |
| 2014/0270160 A1* | 9/2014 | Adams | ................ | H04L 9/0844 |
| | | | | 380/44 |
| 2014/0316768 A1* | 10/2014 | Khandekar | ......... | G06F 16/3329 |
| | | | | 704/9 |
| 2018/0076956 A1* | 3/2018 | Camenisch | ........... | H04L 9/0861 |
| 2019/0065731 A1* | 2/2019 | Brocious | ............ | H04L 63/0838 |
| 2020/0372149 A1* | 11/2020 | Di Pietro | ............... | H04L 9/085 |
| 2023/0045288 A1* | 2/2023 | Cambou | ............... | H04L 9/3236 |

* cited by examiner

*Primary Examiner* — Javier O Guzman
(74) *Attorney, Agent, or Firm* — Steinfl + Bruno LLP (57) ABSTRACT

Disclosed is a server device. The device includes: a communicator; a memory; and a processor. Here, a processor is configured to transmit user interface (UI) data including a plurality of questions to an external device through the communicator, based on the plurality of answers corresponding to the plurality of questions are received from the external device store a plurality of answers in the memory, generate a secret sentence used for generating a password based on the plurality of answers, and transmit the generated secret sentence to the external device through the communicator. The plurality of answers include a homomorphic ciphertext that is homomorphically encrypted by the external device. Accordingly, the password may be generated while maintaining its security.

16 Claims, 8 Drawing Sheets

ELECTRONIC DEVICE FOR GENERATING PASSWORD AND METHODS THEREOF

BACKGROUND

1. Field

The present disclosure relates to an electronic device for generating a password and methods thereof.

2. Description of Related Art

Users use services by accessing various websites as the Internet becomes popular. For some websites, it is necessary to create a user account to use the website. Authentication of the user himself/herself may be required to create the user account. A password may be the most basic method used for the user authentication.

The method of using a password is very convenient. However, the password loses its function at the moment at which the password is exposed to a third party. Therefore, if the user creates the password to use, the user puts a lot of effort into creating a password that has not been used before and that is hard to guess by others.

To reduce this effort, a password generator that generates a password has been developed. However, there is a possibility that the password generated using the password generator may be leaked by an operator or administrator of a server device for providing the password generator.

In addition, if the password generated using the password generator is too complex, it may be difficult for the user to remember the password. Therefore, there is an emerging need for a technology that generates the password while maintaining its security and enables the user to easily remember the password.

SUMMARY

The present disclosure provides a device and a method for generating a more secure and easy-to-remember password.

According to at least one embodiment of the present disclosure, provided is a server device including: a communicator; a memory; and a processor. Here, the processor is configured to transmit user interface (UI) data including a plurality of questions to an external device through the communicator, store a plurality of answers in the memory if the plurality of answers corresponding to the plurality of questions are received from the external device, generate a secret sentence used for generating a password based on the plurality of answers, and transmit the generated secret sentence to the external device through the communicator. Here, the plurality of answers include a homomorphic ciphertext that is homomorphically encrypted by the external device.

According to at least one embodiment of the present disclosure, provided is an electronic device including: a communicator; a display; a memory; and a processor. The processor is configured to generate each of a secret key, a public key, and an operation key for homomorphic encryption, store the keys in the memory, transmit the operation key to a server device through the communicator, control the display to display a user interface (UI) screen corresponding to UI data if the UI data including a plurality of questions is received from the server device through the communicator, generate a plurality of homomorphic ciphertexts by homomorphically encrypting a plurality of answers using the public key if the plurality of answers corresponding to the plurality of questions are input through the UI screen, and decrypt a secret sentence by using the secret key if the secret sentence generated based on the plurality of homomorphic ciphertexts is received from the server device through the communicator.

According to at least one embodiment of the present disclosure, provided is a method for generating a password by a server device, the method including: transmitting user interface (UI) data including a plurality of questions to an external device; generating a secret sentence used for generating a password based on a plurality of answers if the plurality of answers corresponding to the plurality of questions are received from the external device; and transmitting the secret sentence to the external device, wherein the plurality of answers include a homomorphic ciphertext that is homomorphically encrypted by the external device.

According to at least one embodiment of the present disclosure, provided is a method for generating a password by an electronic device, the method including: generating each of a secret key, a public key, and an operation key for homomorphic encryption; transmitting the operation key to a server device; displaying a user interface (UI) screen including a plurality of questions based on UI data provided by the server device; generating a plurality of homomorphic ciphertexts by homomorphically encrypting a plurality of answers using the public key if the plurality of answers corresponding to the plurality of questions are input through the UI screen; transmitting the plurality of homomorphic ciphertexts to the server device; and decrypting a secret sentence by using the secret key if the secret sentence generated based on the plurality of homomorphic ciphertexts is received from the server device.

According to the various embodiments described above, it is possible to generate the password that the user may easily remember while maintaining its security.

BRIEF DESCRIPTION OF THE DRA WINGS

DETAILED DESCRIPTION

Encryption/decryption may be applied as necessary to a process of transmitting information (or data) that is performed in the specification, and an expression describing the process of transmitting the information (or data) in the specification and the claims should be interpreted as including all cases of the encryption/decryption even if not separately mentioned. In the present disclosure, an expression such as "transmission (transfer) from A to B" or "reception from A to B" may include transmission (transfer) or reception while having another medium included in the middle, and may not necessarily express only the direct transmission (transfer) or reception from A to B.

In describing the present disclosure, a sequence of each operation should be understood as non-restrictive unless a preceding operation in the sequence of each operation needs to logically and temporally precede a subsequent operation. That is, except for the above exceptional case, the essence of the present disclosure is not affected even if a process described as the subsequent operation is performed before a process described as the preceding operation, and the scope of the present disclosure should also be defined regardless of the sequences of the operations. In addition, in the specification, "A or B" may be defined to indicate not only selectively indicating either one of A and B, but also including both A and B. In addition, a term "including" in the specification may have a meaning encompassing further including other components in addition to components listed as being included.

The present disclosure only describes essential components necessary for describing the present disclosure, and does not mention components unrelated to the essence of the present disclosure. In addition, it should not be interpreted as an exclusive meaning that the present disclosure includes only the mentioned components, and should be interpreted as a non-exclusive meaning that the present disclosure may include other components as well.

In addition, in the specification, a "value" may be defined as a concept that includes a vector as well as a scalar value.

Mathematical operations and calculations in each step of the present disclosure described below may be implemented as computer operations by a known coding method and/or coding designed to be suitable for the present disclosure to perform the corresponding operations or calculations.

Specific equations described below are illustratively described among possible alternatives, and the scope of the present disclosure should not be construed as being limited to the equations mentioned in the specification.

For convenience of description, the present disclosure defines the following notations:

a←D: Select an element a based on distribution D.

s1, s2∈R: Each of S1 and S2 is an element belonging to a set R.

mod(q): Perform modular operation with an element q.

⌊·⌋: Round an internal value.

Hereinafter, various embodiments of the present disclosure are described in detail with reference to the accompanying drawings.

Figure 1:
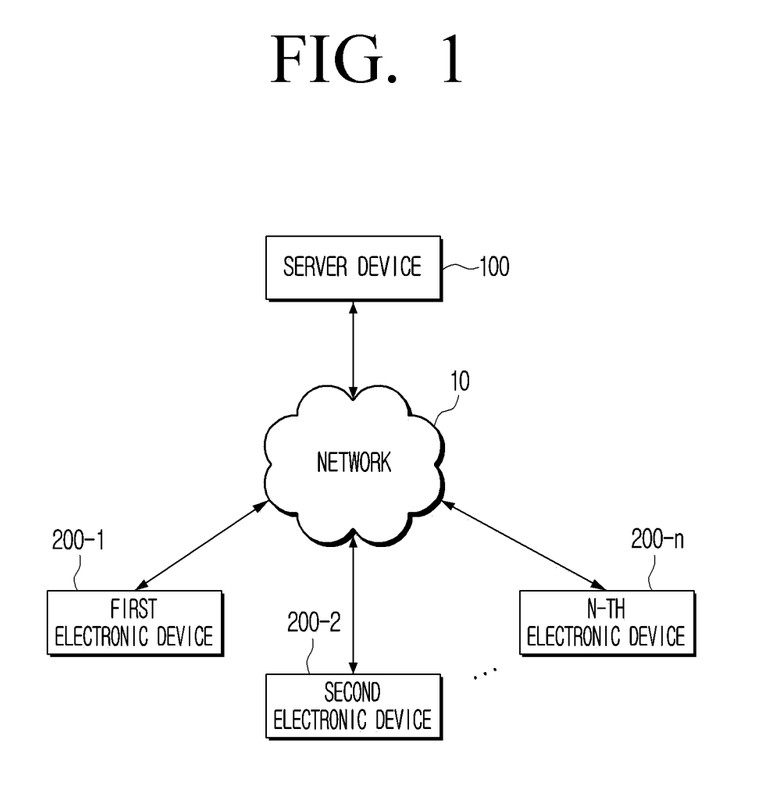
FIG. 1 is a schematic diagram showing a method for generating a password according to at least one embodiment of the present disclosure.

FIG. 1 is a diagram showing a method for generating a password according to at least one embodiment of the present disclosure. Referring to FIG. 1, a server device 100 and a plurality of electronic devices 200-1 to 200-$n$ may be connected to each other through a network 10.

The networks 10 may be implemented in various types of wired and wireless communication networks, broadcast communication networks, optical communication networks, cloud networks, and the like. FIG. 1 shows that the respective devices 100 and 200-1 to 200-$n$ are indirectly connected to one another through the network 10, the devices are not limited thereto, and the respective devices 100 and 200-1 to 200-$n$ may be connected to one another through wireless fidelity (WiFi), Bluetooth, near field communication (NFC), or the like without any separate medium.

The server device 100 shown in FIG. 1 may be an electronic device for generating a secret sentence used for generating a password. The server device 100 may be implemented as one electronic device or as a cloud server. In addition, the server device 100 may be implemented as a web server accessible through the network 10, such as the Internet. FIG. 1 shows the server device 100 to distinguish the corresponding device from the electronic devices 200-1 to 200-$n$. However, the server device 100 may also be alternatively described as the electronic device. In this case, the other electronic devices 200-1 to 200-$n$ may be described as external devices.

The electronic devices 200-1 to 200-$n$ may be various terminal devices used by various users. In detail, each of the electronic devices 200-1 to 200-$n$ may be implemented in various forms such as a personal computer (PC), a laptop PC, a mobile phone, a tablet PC, a kiosk, a television (TV), a home server, an electronic device equipped with an internet of things (IoT) function, and a game player.

The user may access the server device 100 by using an electronic device (e.g., electronic device 200-1) owned by the user. The server device 100 may provide user interface (UI) data including a plurality of questions to the electronic device 200-1.

The electronic device 200-1 may display a UI screen based on the received UI data. The UI screen may display the questions provided by the server device 100. The user may see the question and input an answer the user thinks of. The electronic device 200-1 may perform homomorphic encryption to convert the answer into a homomorphic ciphertext and then transmit the same rather than providing the answer input by the user as it is to the server device 100. Accordingly, the server device 100 is unable to check answer content, and security of a user answer may thus be maintained even if the answer is exposed by the operator, administrator, or the like of the server device 100 or hacked by a third party during the transmission.

The server device 100 may generate the secret sentence based on the answer if the answer is received. The method for generating the secret sentence may be implemented in various ways in some embodiments. As an example, the server device 100 may generate the secret sentence by using a generative artificial intelligence (AI) model. As another example, the server device 100 may generate the secret sentence by detecting a word matching the answer from pre-stored plurality of word pools, and then sequentially arranging the words based on a sentence structure of the secret sentence.

The server device 100 may generate the secret sentence and then provide the secret sentence to the electronic device 200-1. As described above, the secret sentence generated based on the homomorphic ciphertext may also take a homomorphic ciphertext form if the answer itself is the homomorphically-encrypted homomorphic ciphertext. Therefore, it is impossible even for the operator or administrator of the server device 100 to know the answer content input by the user and secret sentence content.

According to the various embodiments, the server device 100 may provide only the secret sentence, or may provide the secret sentence and the password generated based on the secret sentence together. The server device 100 may generate the password based on at least some of sentence components included in the secret sentence and according to a predetermined mnemonic rule. A method of generating the secret sentence and a method of generating the password based on the secret sentence may be described in detail in a description provided below.

The electronic device 200-1 may decrypt the secret sentence by using a secret key and check its content if the electronic device 200-1 receives the secret sentence. The electronic device 200-1 may directly generate the password by combining the words included in the decrypted secret sentence according to the predetermined mnemonic rule.

Alternatively, the electronic device 200-1 may receive the password together with the secret sentence from the server device 100. The password may also be in the homomorphically encrypted state, and the electronic device 200-1 may thus decrypt the secret sentence and the password by using the secret key. Accordingly, the user may check the password and the secret sentence content used for generating the password together.

The user may check the generated password and use the password in various places. For example, it is necessary for the user to create an account to use various websites, and input the password to create the account. In this case, the user may use the password acquired in the above-described manner. Therefore, the user may easily generate the password without exposing his or her private answer content to the outside. In addition, the user may also acquire the secret sentence used for generating the password. The secret sentence may assist the user to remember the password later. That is, the user may recall the password after checking the secret sentence content.

Hereinabove, the description describes a process of securing the password by the electronic device 200-1 which is one of the plurality of electronic devices 200-1 to 200-n. However, the server device 100 may also provide the secret sentence and/or the password to other electronic devices in the same manner.

Figure 2:
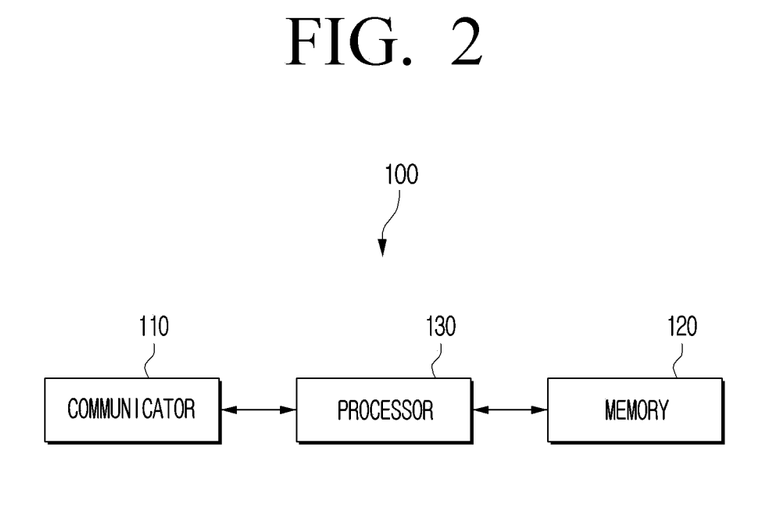
FIG. 2 is a block diagram showing a configuration of a server device according to at least one embodiment of the present disclosure.

FIG. 2 is a block diagram showing a configuration of the server device according to at least one embodiment of the present disclosure. Referring to FIG. 2, the server device 100 may include a communicator 110, a memory 120, and a processor 130.

The communicator 110 may be a component for communicating with various external devices including the electronic devices 200-1 to 200-n. The communicator 110 may transmit and receive various signals and data to the external device by using various wired and wireless communication methods such as a wired/wireless local area network (LAN), a wide area network (WAN), Ethernet, an IEEE 1394, a Bluetooth, an access point (AP) based wireless fidelity (WiFi, i.e., wireless local area network (LAN)), a Zigbee, a high definition multimedia interface (HDMI), a universal serial bus (USB), a mobile high-definition link (MHL), an audio engineering society/European broadcasting union (AES/EBU) communication, an optical communication, and a coaxial communication.

The memory 120 may be a component for storing various programs, data, instructions, or the like required for an operation of the server device 100. The memory 120 may be implemented as at least one of various memories such as a dynamic random access memory (DRAM), a static RAM (SRAM), a synchronous dynamic RAM (SDRAM), an one time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, and a solid state drive (SSD).

The processor 130 may be a component for controlling overall operations of the server device 100. The processor 130 may perform various operations based on an instruction, a program, data, or the like stored in the memory 120.

The processor 130 may be implemented as a digital signal processor (DSP) or a microprocessor, which processes a digital signal. However, the processor 130 is not limited thereto, may include at least one of a central processing unit (CPU), a micro controller unit (MCU), a micro processing unit (MPU), a controller, an application processor (AP), a communication processor (CP), or an advanced RISC machine (ARM) processor, or may be defined by these terms. In addition, the processor 130 may be implemented in a system-on-chip (SoC) or a large scale integration (LSI), in which a processing algorithm is embedded, or may be implemented in the form of a field programmable gate array (FPGA). The processor 130 may perform various functions by executing computer executable instructions stored in the memory 120.

The processor 130 may provide the data to the external device to guide the password generation if the external device accesses the processor 130 through the communicator 110. As an example, the processor 130 may transmit the UI data including the plurality of questions to the external device through the communicator 110.

The processor 130 may then store the plurality of answers in the memory 120 if the plurality of answers corresponding to the plurality of questions are received from the external device. The processor 130 may generate the secret sentence used for generating the password based on the plurality of answers and transmit the same to the external device through the communicator 110. The plurality of answers may include the homomorphic ciphertext that is homomorphically encrypted by the external device.

Figure 3:
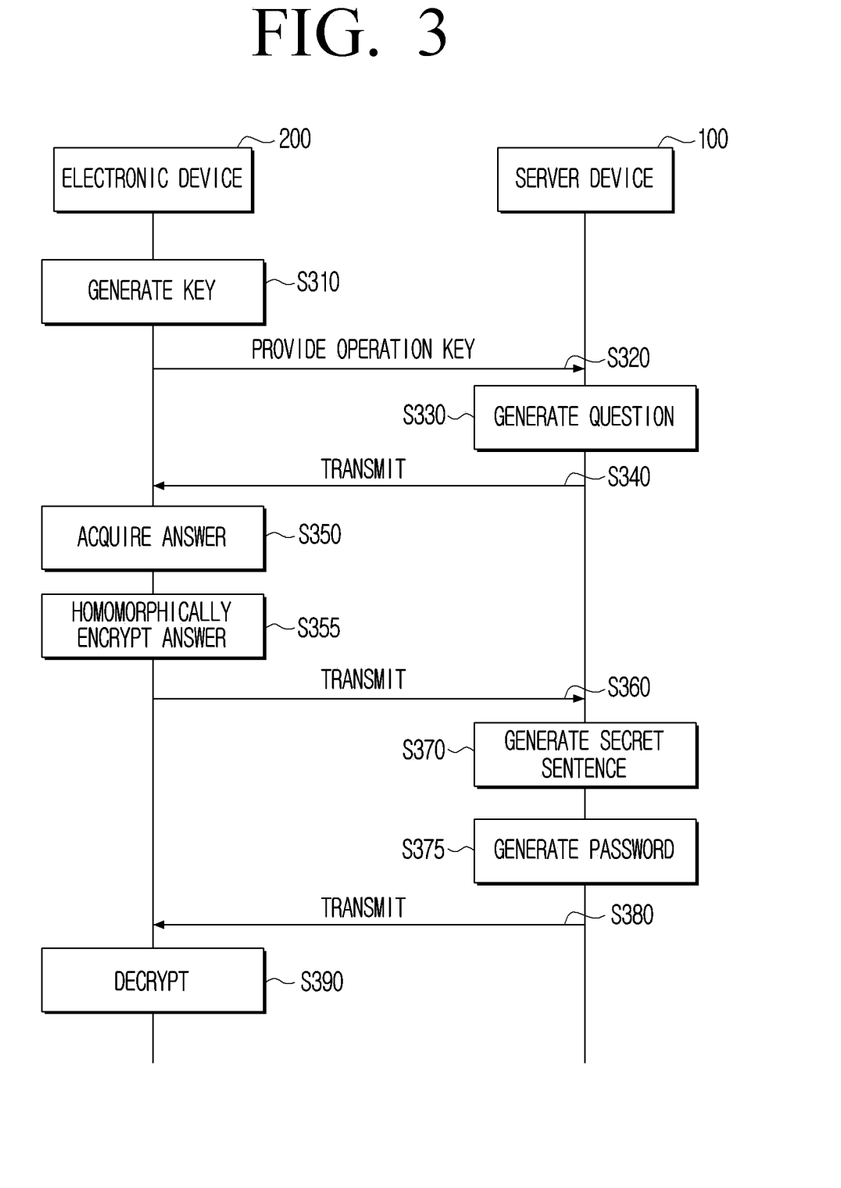
FIG. 3 is a timing diagram showing a process of generating a password according to an embodiment of the present disclosure.

FIG. 3 is a diagram showing an example of a process of generating the password by linking the server device in FIG. 2 with an external device, i.e., the electronic device.

FIG. 3 shows a case where the server device is linked with one of the plurality of electronic devices (hereinafter, referred to as the electronic device 200). The electronic device 200 may be one of the electronic devices 200-1 to 200-n in FIG. 1.

Referring to FIG. 3, the electronic device 200 may first generate a public key, the secret key, an operation key, or the like related to the homomorphic encryption (S310). A method for generating each key is described in detail in a description described below. The external device may transmit the operation key among the generated keys to the server device 100 (S320).

A process of generating the key and transmitting the operation key may be performed while the user of the electronic device 200 accesses the server device 100 to use a service provided by the server device 100. In this case, as shown in FIG. 3, the process of transmitting the operation key may precede a process of generating the question. However, this configuration is merely an example, and the processes of generating the key and transmitting the operation key may be performed after acquiring the answer to the question.

The processor 130 of the server device 100 may store the operation key in the memory 120 if the operation key is received from the external device.

The processor 130 may generate the plurality of questions to secure the answer to be used for generating the secret sentence (S330), and then transmit the generated questions to the external device (S340). The processor 130 may generate the question immediately after receiving the operation key, is not necessarily limited thereto, and may also generate the question if a user request is input.

The question is to secure the answer used for generating the secret sentence. The question may be classified into various types. As an example, the question may be classified into a privacy question to secure the answer based on the user's personal information and a general question to secure the answer based on a simple preference or another common situation. In detail, the privacy question may correspond to directly asking about the user's name, date of birth, wedding anniversary, address, occupation, or the like, and the general question may correspond to asking about the user's favorite weather, color, fruit, singer, or the like.

The question may be generated in various ways.

As an example, the processor 130 may randomly select the question from a question data base that is pre-stored in the memory 120 and another external server. The question database is a database where various types of questions are predetermined and stored. The question database may include various questions such as the privacy question and the general question described above.

Alternatively, the processor 130 may generate the question by using the generative AI model stored in the memory 120. For example, the processor 130 may secure the question generated by the generative AI model by inputting, to the generative AI model, information of the external device (its device type, manufacturer, serial number, or the like), user information of the external device (the user account, the user name, user current location, or the like), and information related to a time at which the external device accesses the server device 100 (date, season, weather, or the like).

Alternatively, the processor 130 may generate the question based on words included in a post uploaded to another server connected thereto (for example, the web server). For example, if connected to the web server that provides a portal website that includes various news, and weather information is uploaded, the processor 130 may generate the question asking about his/her favorite weather. Alternatively, if an article about a celebrity is uploaded, the server device 100 may generate the question asking about the celebrity the user likes.

Alternatively, the processor 130 may use the question input by the administrator or operator of the server device 100 as is.

In addition, the processor 130 may repeatedly use the plurality of questions stored in the memory 120 for each of the external devices in the same manner.

The processor 130 may secure the question in various ways as described above, and then transmit the UI data including the question to the electronic device 200 (S340).

The UI data may include various data used to configure and display the UI screen in the electronic device 200. The electronic device 200 may display the UI screen including the plurality of questions based on the UI data. The electronic device 200 may acquire the answer corresponding to each question through the UI screen (S350).

The electronic device 200 may homomorphically encrypt the acquired answer by using the public key (S355). The electronic device 200 may transmit the homomorphically-encrypted homomorphic ciphertexts to the server device 100 (S360).

If $m_{kw}$ indicates the answer, which is a plaintext input by the user, an encrypted answer $c_{kw}$ may be expressed as follows.

$$c_{kw} = Enc_{pk}(m_{kw}). \quad \text{[Equation 1]}$$

Meanwhile, the processor 130 of the server device 100 may also provide the UI data in the form of a menu added to the UI screen, from which the user may select options. In this case, the electronic device 200 may display the UI screen that includes the menu in the form of a check box asking whether to add uppercase letters, numbers, special characters, or the like to the password. If the user selects the check box, the electronic device 200 may transmit password setting option information corresponding to a selected item to the server device 100 together with the homomorphically encrypted answer.

The processor 130 of the server device 100 may store the received homomorphic ciphertexts in the memory 120 if a response signal including the homomorphic ciphertexts for the plurality of answers is received from the external device through the communicator 110.

For example, if the questions ask about the user's favorite season, the music the user listens to often these days, and the user's favorite color, and the user inputs the respective answers Winter, Sweet, and Blue to these questions, the external device may acquire the homomorphic ciphertext by using the public key for the homomorphic encryption to thus homomorphically encrypt each answer.

The processor 130 may generate the secret sentence based on the answers included in the response signal (S370). The answer may be homomorphically encrypted, and the processor 130 may thus only perform the operation by using the operation key in the encrypted state and is unable to check the answer content. That is, the secret sentence generated by performing the operation on the plurality of homomorphic ciphertexts for the plurality of answers may also take the homomorphic ciphertext form.

The secret sentence may be generated in various ways. As an example, the server device 100 may generate the secret sentence by using the generative AI model. The processor 130 may couple a user input value, that is, the answer, with a prompt including content of requesting the AI model to generating a sentence that has no meaning while having a grammatical structure, and input the same to the generative AI model. If the plurality of questions are used and the plurality of answers are input, the processor 130 of the server device 100 may use all of the plurality of answers or may use only some of the answers to thus generate the secret sentence.

The processor 130 may generate the secret sentence for at least one of the input answers to be included as it is in the secret sentence, and the rest of the answers to be included in a form that may be naturally recalled from the secret sentence. If Winter, Sweet, and Blue are input as the answers as in the example above, the processor 130 may generate the secret sentence such as "the freeze air carried hot chocolate, blue essence". This sentence is grammatically correct while making no sense. In addition, this sentence includes Blue among the answers input by the user. On the other hand, Winter and Sweet may be naturally recalled from the sentence even though these words are not directly included in the sentence. The generative AI model may be implemented to perform the operation on the answer that is in the homomorphic encrypted state, and then stored in the memory 120. Therefore, a result of executing the generative AI model on the answer in the plaintext state and a result of executing the generative AI model on the answer in the encrypted state may be the same as each other.

If the generative AI model is defined as a function f, the encrypted generative AI model $f_{evk}$ may be expressed as the following equation.

$$f_{evk}(c_{kw}, c_{server}) = Enc_{pk}\{f(m_{kw}, m_{server})\} \qquad \text{[Equation 2]}$$

In Equation 2, $m_{kw}$ indicates the plaintext answer input by the user, $c_{kw}$ indicates the homomorphic ciphertext for the answer, and $c_{server}$ and $m_{server}$ indicate random values that the generative AI model uses to generate the secret sentence.

The processor 130 may generate the password based on the secret sentence (S375). The processor 130 may generate the password by modifying the secret sentence by performing a simple manipulation thereon. In detail, the processor 130 may generate the password by combining the words included in the secret sentence according to the predetermined mnemonic rule. The mnemonic rule is a rule to make it easier to remember information. As an example, the mnemonic rule may use a method of detecting the first few letters of each phrase and modifying some words according to a series of rules. For example, the password may be generated as Gr2d@nc@fw2! if the generated secret sentence is Green dances cafelatte weird, and the mnemonic rule is a rule in which the first three alphabets of each word are used, e is the Arabic numeral 2, i is !, and a is modified into @.

The processor 130 may transmit the generated password and secret sentence to the electronic device 200 through the communicator 110 (S380). The secret sentence and the password may be in the homomorphically encrypted state.

The electronic device 200 may decrypt each of the secret sentence and the password by using the previously generated secret key (S390). A decrypted secret sentence SS and password PW may be expressed as follows.

$$SS, PW = Dec_{sk}\{f_{evk}(c_{kw}, c_{server})\}. \qquad \text{[Equation 3]}$$

Here, sk may indicate the secret key.

Hereinabove, the description describes an embodiment of generating the secret sentence by using the generative AI model. However, the present disclosure is not necessarily limited thereto, and the secret sentence may be generated based on the plurality of word pools and according to sentence generation rules rather than the generative AI model.

Figure 4:
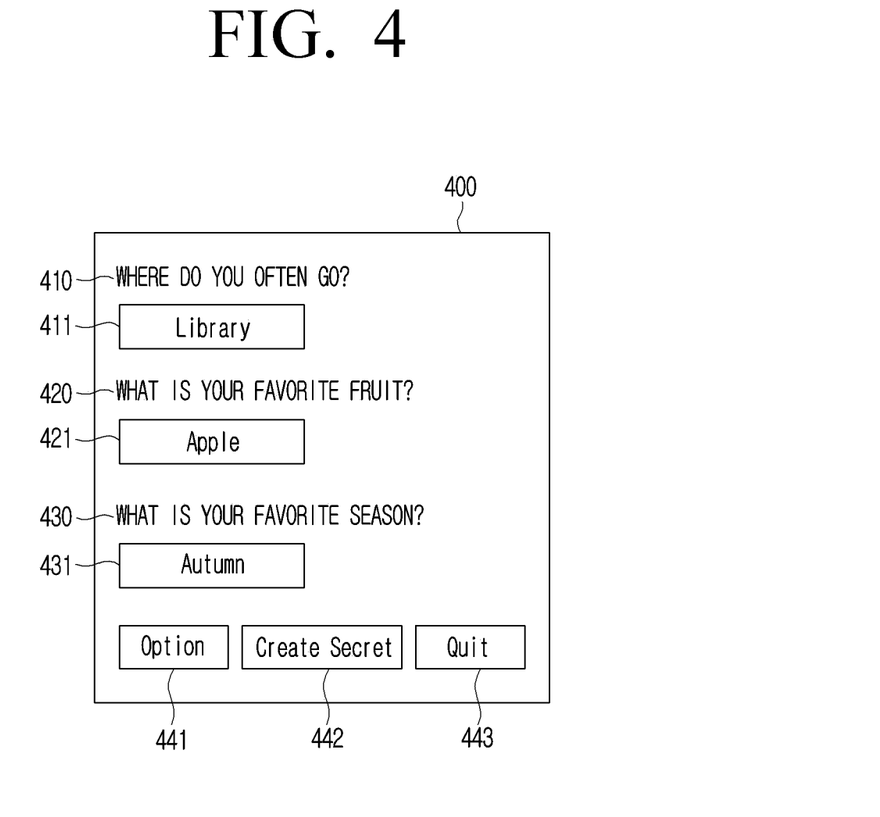
FIG. 4 is a diagram showing an example of a user interface (UI) screen displayed on an electronic device.

FIG. 4 is a diagram showing an example of a user interface (UI) screen displayed on the electronic device 200. Referring to FIG. 4, a UI screen 400 displayed on the electronic device 200 may display a plurality of questions 410, 420, and 430, a plurality of answer input regions 411, 421, and 431, a plurality of menus 441, 442, and 443, and the like.

FIG. 4 shows a state where the three questions 410, 420, and 430 are sequentially displayed and the answer input regions 411, 421, and 431 are displayed below each of the questions. If the electronic device 200 is the mobile phone, and the user touches the answer input region 411, 421, or 431, a soft keyboard may be additionally displayed on the screen for inputting various characters, numbers, and symbols. The user may input various answers by using the soft keyboard. FIG. 4 shows a state where the answer is input, such as Library, Apple, and Autumn.

The menus 441, 442, and 443 may include the first menu 441 for setting an option, the second menu 442 for requesting the secret sentence generation, and the third menu 443 for exiting the UI screen. If the user selects the first menu 441, the UI screen may be changed to a setting screen for setting various options such as whether to classify uppercase letters, lowercase letters, or the like, whether to include numbers, whether to include special characters, a password renewal cycle, a password length, and security strength.

If the user selects the second menu 442, the electronic device 200 may homomorphically encrypt the input answer, and then transmit the homomorphic ciphertext to the server device.

Figure 5:
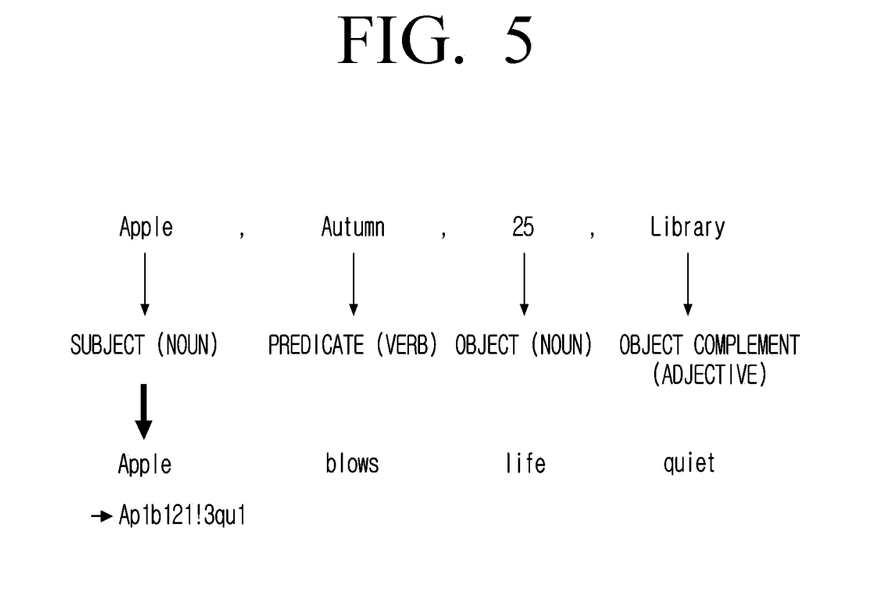
FIG. 5 is a diagram showing an example of a method for sequentially generating a secret sentence and a password.

FIG. 5 is a diagram showing a method for generating the secret sentence by using a method other than the generative AI model.

The memory 120 of the server device 100 may store the data on the structure of the secret sentence and the plurality of word pools corresponding to the respective sentence components of the secret sentence.

The processor 130 may detect at least one word matching at least one answer among the plurality of answers from the plurality of word pools, and generate the secret sentence by sequentially arranging the detected at least one word according to the sentence structure.

The structure of the secret sentence may be determined in various ways. For example, the structure of the secret sentence may be determined as the fourth form (subject+predicate+indirect object+direct object) or the fifth form (subject+predicate+object+objective complement) according to English grammar. The structure of the secret sentence may also be determined in various other ways. The sentence structure may be set to one, is not limited thereto, and the plurality of sentence structures may all be stored in the memory 120. In this case, the processor 130 may select one of the sentence structures randomly or based on a user setting.

FIG. 5 shows a state where the fifth form is set. The processor 130 may detect words that correspond to the subject and the object in a noun pool, a word that corresponds to a predicate in a verb pool, and a word that corresponds an object complement in an adjective pool.

The processor 130 may arrange the input answers in a predetermined order or in a random order, and then detect words matching the respective answers from the word pool.

The processor 130 may use the user answer as a seed for the sentence generation. As shown in FIG. 4, if the three answers are input and the fifth form is selected, the processor 130 may randomly assign the input answers to the respective sentence component. FIG. 5 shows a state where Apple is assigned as the subject, Autumn as the predicate, and Library as the object complement. If the number of input answers does not match the given form, the processor 130 may generate at least one random answer and use this random answer together with the answer actually input by the user. For example, the processor 130 may assign the random answer to a sentence component to which the user answer is not assigned. As shown in FIG. 5, all the answers may be arranged in an order of Apple, Autumn, 25, and Library by generating the random answer as 25. The processor 130 may detect words matching the arranged answers from the word pool as described above.

In detail, the electronic device 200 may encrypt the answer by converting the answer into an embedding vector and then transmit the same. If the homomorphic encryption is performed using a CKKS scheme that supports a single instruction multiple data (SIMD) method, the homomorphic ciphertext for each answer may have the form of a 128-dimensional real number vector. The words stored in the word pool may also be stored in the form of real vectors, and each word pool may include a matrix having a size of the number of words*128.

The processor 130 may compute cosine similarity by performing a homomorphic encryption operation on the words stored in the word pool and the respective answers. The processor 130 may perform the homomorphic encryption operation by using the operation key generated and provided by the electronic device 200. In detail, the homomorphic encryption operation may include element-wise multiplication and a row-wise sum (or horizontal sum).

The processor 130 may select the word matching the answer from each word pool based on the cosine similarity. In case of calculating the cosine similarity for all words included in the word pool, the processor 130 may select the word having the highest cosine similarity as the word matching the answer.

As another example, the processor 130 may select the first word found among the words having the cosine similarity higher than a predetermined threshold value as the word matching the answer. For example, if the threshold value is set to 0.8, the processor 130 may stop word search and select the detected word as soon as detecting a word having the cosine similarity of 0.8 or more. The processor 130 may randomly select a word search location. For example, if the processor 130 always performs filtering from a first word in the word pool, there is a possibility of selecting similar words, which may lower the password security. Therefore, the processor 130 may perform the word search at a random location in each word pool. In detail, the processor 130 may generate a random constant (integer) before selecting a word, compute a random constant-modular operation value (pool size mod random integer, integer % pool_size) for a word pool size (or pool size), and perform the filtering by starting from an index corresponding to the computed value.

As described above, some answers may be used as input by the user. FIG. 5 shows a state where Apple is used as it is. On the other hand, FIG. 5 shows a state where a word matching Autumn is selected as blows, a word matching 25 is selected as life, and a word matching Library is selected as quiet. As a result, the processor 130 may generate a secret sentence "Apple blows life quiet". As described above, the secret sentence is grammatically correct while making no sense, and may be helpful in recalling the password.

The processor 130 may generate the password from the secret sentence according to the mnemonic rule. As shown in FIG. 5, a password such as Aplb121!3qu1 may be generated if it is determined according to the mnemonic rule that the first two alphabets of each word are detected, 1 is converted to 1, i is converted to !, and numbers are sequentially added one by one in an order of 1, 2, 3, 1, 2, 3 for each two letters.

Referring to FIG. 3, the description describes that the server device 100 generates both the secret sentence and the password. However, in some embodiments, the electronic device 200 may generate the password.

Figure 6:
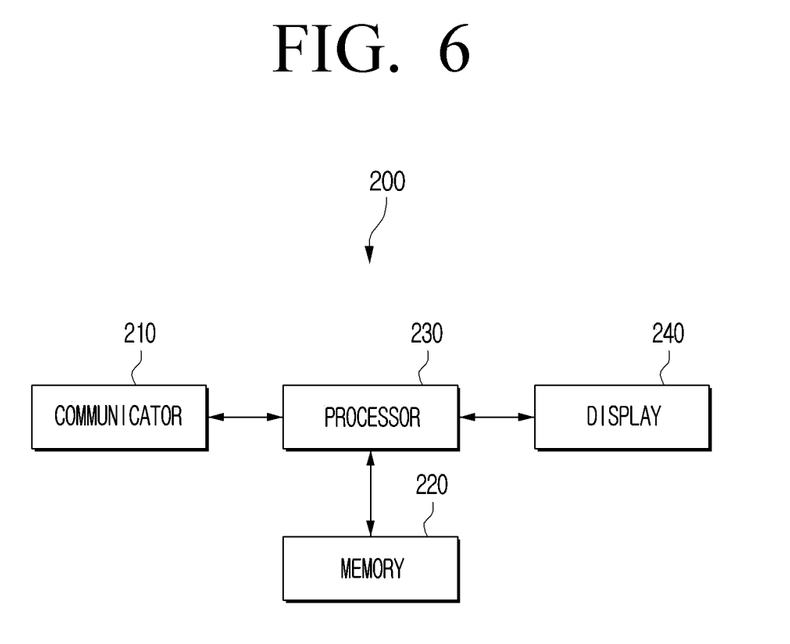
FIG. 6 is a block diagram showing a configuration of the electronic device according to at least one embodiment of the present disclosure.

FIG. 6 is a block diagram showing a configuration of the electronic device according to at least one embodiment of the present disclosure. Referring to FIG. 6, the electronic device 200 may include a communicator 210, a memory 220, a processor 230, and a display 240.

Detailed examples of the communicator 210, the memory 220, and the processor 230 are described in the description above with reference to FIG. 2, and the description thus omits their redundant examples.

The communicator 210 may be a component for communicating with the server device 100 and other external devices.

The memory 220 may be a component for storing various software, data, and instructions, required for the operation of the electronic device 200.

The display 240 may display various screens under control of the processor 240. As an example, the display 240 may display the UI screen or the like as shown in FIG. 4. The display 240 may be implemented as a display including a self-light emitting element or a display including a non self-light emitting element and a backlight. For example, the display 240 may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, and a quantum dot light-emitting diode (QLED) display. The display 240 may also include a driving circuit, a backlight unit, and the like, which may be implemented in a form such as an a-si thin film transistor (TFT), a low temperature poly silicon (LTPS) TFT, or an organic TFT (OTFT).

The processor 230 may perform various operations based on the various software, data, and instructions, stored in the memory 220.

In detail, the processor 230 may generate each of the secret key, the public key, and the operation key for the homomorphic encryption, store the keys in the memory 220, and transmit the operation key among these keys to the server device through the communicator 210.

The public key may be the key used for generating the homomorphic ciphertext, and the secret key may be the key used to decrypt the homomorphic ciphertext. The operation key may be a key used for various operations (evaluation or computation) based on the homomorphic ciphertext. In detail, the operation key may include a relinearization key rlk, a rotation key rotKey, or the like. The relinearization key may be used for a multiplication operation, and the rotation key may be used for a rotation operation.

As an example, the processor 230 may generate the public key by using a Ring-LWE scheme. To describe in detail, the processor 230 may first set various parameters and rings, and store the same in the memory 220. The parameters here are not parameters used in training the AI model, but parameters used in a homomorphic encryption technique. Examples of the parameters may include a bit length of a plaintext message, a size of the public key, a size of the secret key, and the like.

The ring may be expressed by the following equation.

$$R = Z_q[X]/f(x) \qquad \text{[Equation 4]}$$

Here, R indicates the ring, Zq indicates a coefficient, and f(x) indicates an N-th polynomial.

The ring indicates a set of polynomials having predetermined coefficients, and indicates the set in which addition and multiplication are defined between elements and which is closed under the addition and multiplication.

As an example, the ring R indicates a set of the N-th polynomials having the coefficient Zq. In detail, if n is Φ(N), N indicates a polynomial which may be calculated as the remainder of dividing the polynomial by an N-th cyclotomic polynomial.

In Equation 4, (f(x)) indicates ideal of Zq[x] generated by f(x). The Euler totient function Φ(N) indicates the number of natural numbers that are relative prime to N and smaller than N. If ΦN(x) is defined as the n-th cyclotomic polynomial, the ring may also be expressed by Equation 5 as follows.

$$R = Z_q[X]/\Phi_N(x) \qquad \text{[Equation 5]}$$

Meanwhile, the ring R in Equation 5 described above may have binary data in a plain text space. If the ring is set in this way, the processor 230 may calculate a secret key sk from the ring. The secret key sk may be expressed as follows.

$$sk \leftarrow (1, s(x)), s(x) \in R. \qquad \text{[Equation 6]}$$

Here, s (x) indicates a random polynomial generated using a small coefficient.

In addition, the processor 230 may calculate a first random polynomial a (x) from the ring. The first random polynomial may be expressed as follows.

$$a(x) \leftarrow R. \qquad \text{[Equation 7]}$$

In addition, the processor 230 may calculate an error. In detail, the processor 230 may extract the error from a discrete Gaussian distribution or a distribution having a statistical distance close thereto. This error may be expressed as follows.

$$e(x) \leftarrow D_{\alpha q}^n. \qquad \text{[Equation 8]}$$

If even the error is calculated, the processor 230 may calculate a second random polynomial by performing the modular operations on the error in the first random polynomial and the secret key. The second random polynomial may be expressed as follows.

$$b(x) = -a(x)s(x) + e(x)(\bmod q). \qquad \text{[Equation 9]}$$

Finally, a public key pk may be set to include the first random polynomial and the second random polynomial as follows.

$$pk = (b(x), a(x)). \qquad \text{[Equation 10]}$$

The key generation method described above is merely an example, and is not necessarily limited thereto, and the processor 230 may also generate various keys in other ways.

The processor 230 may store information on the keys generated for the homomorphic encryption in the memory 220.

The processor 230 may control the display 240 to display the UI screen corresponding to the UI data if the UI data including the plurality of questions is received from the server device 100 through the communicator 210.

The processor 230 may generate the plurality of homomorphic ciphertexts by homomorphically encrypting the plurality of answers using the public key if the plurality of answers corresponding to the plurality of questions are input through the UI screen.

The homomorphic ciphertext generated by the processor 230 may satisfy the following property in case of being decrypted later by using the secret key.

$$Dec(ct, sk) = \langle ct, sk \rangle = M + e(\bmod q). \qquad \text{[Equation 11]}$$

Here, < and > indicate dot product calculation (or usual inner product), ct indicates the ciphertext, sk indicates the secret key, e indicates an encryption error value, and mod q indicates a modulus of the ciphertext. M indicates the plaintext message, which may be the answer in the various embodiments of the present disclosure.

q needs to be chosen to be larger than the result value M multiplied by a scaling factor Δ to the message. If an absolute value of the error value e is sufficiently smaller than M, a decryption value M+e of the ciphertext may be a value that may replace an original message by the same precision in a significant figure operation. Among decrypted data, the error may be disposed on the least significant bit (LSB) side, and M may be disposed on the next least significant bit side.

If a size of the message is too small or too large, the processor 230 may adjust the size by using the scaling factor. If the scaling factor is used, not only a message in an integer form but also a message in a real number form may be encrypted, and its usability may thus be greatly increased. In addition, the size of the message may be adjusted using the scaling factor to thus also adjust a size of an effective region, that is, a region where the messages exist in the ciphertext after the operation is performed.

In some embodiments, the modulus q of the ciphertext may be set and used in various forms. As an example, the modulus of the ciphertext may be set in the form of an exponential power q=ΔL of the scaling factor Δ. If Δ is 2, the modulus may be set to a value such as q=210.

In addition, the homomorphic ciphertext according to the present disclosure is described assuming that a fixed point is used. However, the homomorphic ciphertext may also be applied even in case that a floating point is used.

The processor 230 may transmit the plurality of homomorphic ciphertexts, and then decrypt the secret sentence by using the secret key if the secret sentence generated based on the plurality of homomorphic ciphertexts is received from the server device 100 through the communicator 210.

The processor 230 may also decrypt the received password by using the secret key if the homomorphically encrypted password is also received from the server device 100.

The processor 230 may control the display 240 to display the decrypted secret sentence and password. The user may use the generated password on the various websites, or the like. The user may infer the password by referring to the secret sentence if the password is difficult to remember. The processor 230 may control the display 240 to display the secret sentence if the user fails to remember the password and selects a menu for checking the secret sentence.

Meanwhile, if the server device 100 generates and transmits only the secret sentence, the processor 230 may directly generate the password by decrypting the secret sentence and then combining words included in the decrypted secret sentence according to the predetermined mnemonic rule. For this purpose, the memory 220 may store the data for the mnemonic rule. The description above describes in detail the example and method of generating a password according to the mnemonic rule, and thus omits their redundant descriptions.

Figure 7:
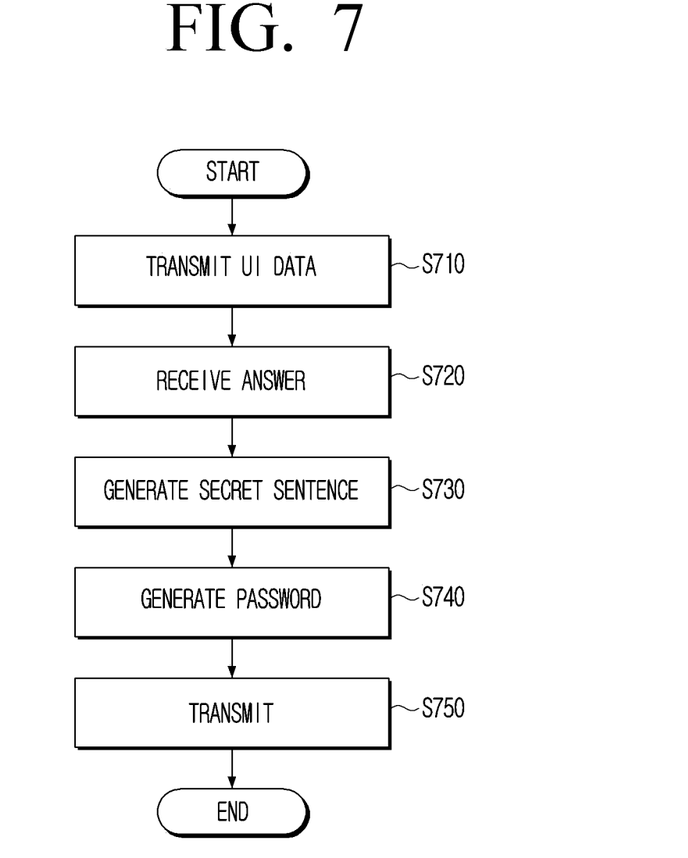
FIG. 7 is a flow chart showing a method for generating a password by a server device according to at least one embodiment of the present disclosure.

FIG. 7 is a flow chart showing the method for generating a password by the server device according to at least one embodiment of the present disclosure.

Referring to FIG. 7, the server device may transmit the UI data (S710), and then receive the answer thereto (S720). The server device may generate the secret sentence based on the received answer (S730), and then generate the password based on the secret sentence (S740). The received answer may have the homomorphic ciphertext form, the secret sentence and the password, generated based on the answer, may also have the homomorphic ciphertext form. The server device may perform the homomorphic encryption operation by using the operation key provided by the electronic device to thus generate the secret sentence. The server device may transmit the generated secret sentence and password to the electronic device (S750). In some embodiments, the generating of the password may be omitted.

Figure 8:
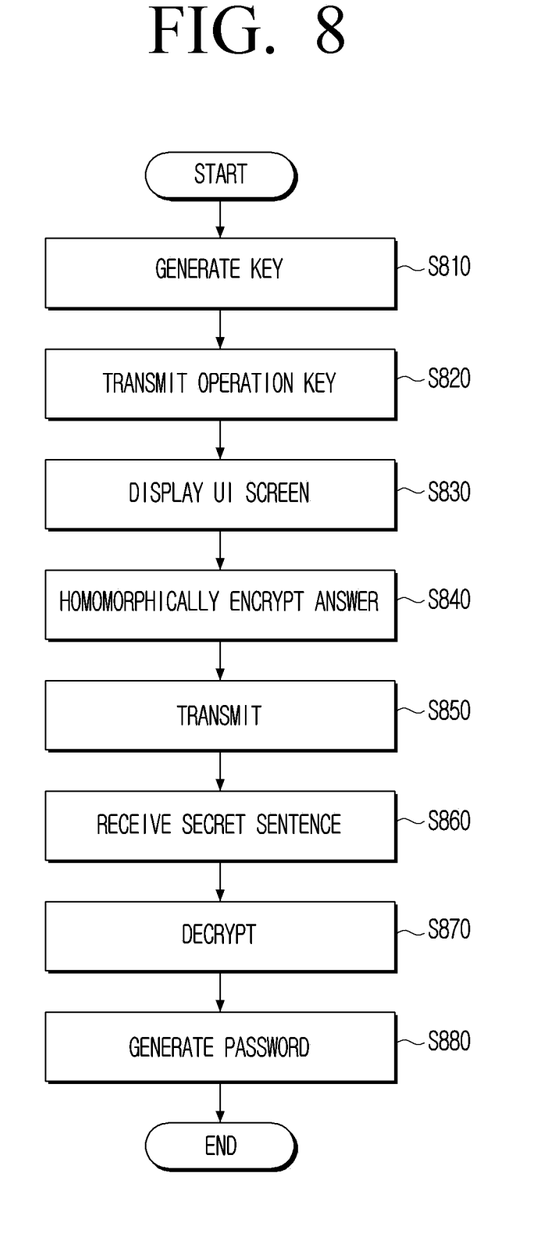
FIG. 8 is a flow chart showing a method for generating a password by an electronic device according to at least one embodiment of the present disclosure.

FIG. 8 is a flow chart showing the method for generating a password by the electronic device according to at least one embodiment of the present disclosure.

Referring to FIG. 8, the electronic device may generate the public key, the secret key, the operation key, and the like (S810), and then transmit the operation key among the keys to the server device (S820).

The electronic device may display the UI screen including the question (S830) if the UI data including the question is received from the server device. The electronic device may homomorphically encrypt the input answers and transmit the same (S840 and S850) if the user inputs the answers to the questions. According to an embodiment, all of the answers input by the user may be homomorphically encrypted. However, the present disclosure is not necessarily limited thereto. For example, the question may not be related to or have low relevance to the user's personal information, such as a question asking about the user's favorite season, favorite fruit, or the like. In this case, the electronic device does not necessarily need to maintain the security if the answer. Therefore, the electronic device may transmit such an answer as it is without performing the homomorphic encryption thereon, and transmit the answer by performing the homomorphic encryption thereon if the question asks for the personal information such as the user's name or address.

Next, if the secret sentence generated based on the answer is received from the server device (S860), the electronic device may decrypt the secret sentence (S870), and generate the password from the decrypted secret sentence (S880). However, the electronic device is not limited thereto, and may also decrypt the password and provide the same to the user if the server device generates and transmits the password. The description above describes the method for generating a key, the method for performing homomorphic encryption, the method for generating a secret sentence, and the method for generating a password, and thus omits their redundant description.

The method for generating a password described with reference to FIGS. 7 and 8 may be performed by the server device and the electronic device each having the configurations shown in FIG. 2 and FIG. 6, is not necessarily limited thereto, and may also be performed by another type of device in which some configurations are added, omitted, or modified.

Hereinabove, the description describes the method for generating a password based on the case where the user accesses the server device 100 by using his/her electronic device 200 to generate the password. However, the method for generating a password described above may also be performed on various web servers in addition to a dedicated server device. In this case, a program for executing the method for generating a password according to the various embodiments described above may be provided to each web server in the form of a plug-in. Each web server may be implemented to input the password generated using the plug-in program if the user needs to generate the password.

For example, the user may have to input the password if the user wants to register as a member by accessing a specific website (for example, a social networking service (SNS) site). The corresponding web server may display a menu for executing the password generator on a member registration screen. If the user selects the corresponding menu, the web server may generate the question as described above and display the same on the website. If the user inputs the answer by using his/her electronic device, the electronic device may generate the homomorphic ciphertext and provide the same to the web server. Next, if the password is generated in the manner described in the various embodiments described above, the electronic device may immediately display the generated password in the password input region on the member registration screen. If the user selects a confirmation menu, the displayed password may be confirmed.

As described above, the method for generating a password according to the various embodiments of the present disclosure may be performed by various devices, and the program for performing this method may be distributed by being stored on a non-transitory readable recording medium.

For example, the following program may be stored on the non-transitory readable recording medium, the program being for performing: the transmitting of the UI data including the plurality of questions to the external device; the generating of the secret sentence used for generating the password based on the plurality of answers if the plurality of answers corresponding to the plurality of questions are received from the external device; and the transmitting of the secret sentence to the external device. A device equipped with this medium may perform the same operations as the server device described above.

Alternatively, the following program may be stored on the non-transitory readable medium, the program being for performing: generating each of the secret key, the public key, and the operation key for the homomorphic encryption; the transmitting of the operation key to the server device; the displaying of the UI screen including the plurality of questions based on the UI data provided by the server device; the generating of the plurality of homomorphic ciphertexts by homomorphically encrypting the plurality of answers using the public key if the plurality of answers corresponding to the plurality of questions are input through the UI screen; the transmitting of the plurality of homomorphic ciphertexts to the server device; and the decrypting of the secret sentence by using the secret key if the secret sentence generated based on the plurality of homomorphic ciphertexts is received from the server device. A device equipped with this medium may perform the same operations as the server device described above.

In the non-transitory readable storage medium, the term "non-transitory" indicates that the storage medium is tangible without including a signal, and does not distinguish whether the data are semi-permanently or temporarily stored in the storage medium.

In addition, the methods according to the various embodiments described above may be included in a computer program product and then provided. The computer program product may be traded as a product between a seller and a purchaser. The computer program product may be distributed in a form of a storage medium (for example, a compact disc read only memory (CD-ROM)) that may be read by a device or online through an application store (for example, PlayStore™). In case of the online distribution, at least portions of the computer program product may be at least temporarily stored in the storage medium such as a memory of a server of a manufacturer, a server of an application store or a relay server, or be temporarily created.

Each component (e.g., module or program) in the various embodiments may include a single entity or a plurality of entities, and some of the corresponding sub-components described above may be omitted or other sub-components may be further included in the various embodiments. Alternatively or additionally, some of the components (e.g., modules or programs) may be integrated into a single entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or may be omitted, or other operations may be added.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A server device comprising:
   a communicator;
   a memory; and
   a processor configured to
   transmit user interface (UI) data including a plurality of questions to an external device through the communicator,
   based on the plurality of answers corresponding to the plurality of questions are received from the external device, store a plurality of answers in the memory,
   generate a secret sentence used for generating a password based on the plurality of answers, and transmit the generated secret sentence to the external device through the communicator,
   wherein the plurality of answers include a homomorphic ciphertext that is homomorphically encrypted by the external device.

2. The device as claimed in claim 1, wherein the processor is configured to
   generate the password by combining words included in the secret sentence according to a predetermined mnemonic rule, and
   transmit the secret sentence and the password to the external device through the communicator, and the secret sentence and the password are in a homomorphically encrypted state.

3. The device as claimed in claim 2, wherein the memory stores a generative artificial intelligence (AI) model, and
   the processor is configured to generate the secret sentence by inputting the plurality of answers into the generative AI model.

4. The device as claimed in claim 2, wherein the memory stores a plurality of word pools corresponding to respective sentence components of the secret sentence and data on a structure of the secret sentence, and
   the processor is configured to
   detect at least one word matching at least one answer among the plurality of answers from the plurality of word pools, and
   generate the secret sentence by sequentially arranging the detected at least one word according to the sentence structure.

5. The device as claimed in claim 4, wherein the processor is configured to
   generate at least one random answer, and
   generate the secret sentence based on the plurality of answers and the at least one random answer.

6. The device as claimed in claim 3 or 4, wherein the processor is configured to
   generate at least one random answer, and
   generate the secret sentence based on the plurality of answers and the at least one random answer.

7. An electronic device comprising:
   a communicator;
   a display;
   a memory; and
   a processor configured to
   generate each of a secret key, a public key, and an operation key for homomorphic encryption, store the keys in the memory, transmit the operation key to a server device through the communicator,
   based on the UI data including a plurality of questions is received from the server device through the communicator, control the display to display a user interface (UI) screen corresponding to UI data,
   based on the plurality of answers corresponding to the plurality of questions are input through the UI screen, generate a plurality of homomorphic ciphertexts by homomorphically encrypting a plurality of answers using the public key, and
   based on the secret sentence generated based on the plurality of homomorphic ciphertexts is received from the server device through the communicator, decrypt a secret sentence by using the secret key.

8. The device as claimed in claim 7, wherein the processor is configured to based on the password generated by combining words included in the secret sentence according to a predetermined mnemonic rule is received from the server device through the communicator, decrypt a password by using the secret key.

9. The device as claimed in claim 7, wherein the memory stores data for a predetermined mnemonic rule, and
   the processor is configured to
   decrypt the secret sentence received from the server device by using the secret key, and
   generate a password by combining words included in the decrypted secret sentence according to the mnemonic rule.

10. A method for generating a password by a server device, the method comprising:
- transmitting user interface (UI) data including a plurality of questions to an external device;
- based on the plurality of answers corresponding to the plurality of questions are received from the external device, generating a secret sentence used for generating a password based on a plurality of answers; and
- transmitting the secret sentence to the external device,
- wherein the plurality of answers include a homomorphic ciphertext that is homomorphically encrypted by the external device.

11. The method as claimed in claim 10, further comprising:
- generating the password by combining words included in the secret sentence according to a predetermined mnemonic rule; and
- transmitting the password to the external device,
- wherein the secret sentence and the password are in a homomorphically encrypted state.

12. The method as claimed in claim 11, wherein in the generating of the secret sentence based on the plurality of answers,
- the secret sentence is generated by inputting the plurality of answers into a generative artificial intelligence (AI) model.

13. The method as claimed in claim 11, wherein the generating of the secret sentence based on the plurality of answers includes:
- detecting at least one word matching at least one answer among the plurality of answers from a plurality of pre-stored word pools; and
- generating the secret sentence by sequentially arranging the detected at least one word according to a sentence structure.

14. A method for generating a password by an electronic device, the method comprising:
- generating each of a secret key, a public key, and an operation key for homomorphic encryption;
- transmitting the operation key to a server device;
- displaying a user interface (UI) screen including a plurality of questions based on UI data provided by the server device;
- based on the plurality of answers corresponding to the plurality of questions are input through the UI screen, generating a plurality of homomorphic ciphertexts by homomorphically encrypting a plurality of answers using the public key;
- transmitting the plurality of homomorphic ciphertexts to the server device; and
- based on the secret sentence generated based on the plurality of homomorphic ciphertexts is received from the server device, decrypting a secret sentence by using the secret key.

15. The method as claimed in claim 14, further comprising based on the password generated by combining words included in the secret sentence according to a predetermined mnemonic rule is received from the server device, decrypting a password by using the secret key.

16. The method as claimed in claim 14, further comprising decrypting the secret sentence received from the server device by using the secret key, and
- generating a password by combining words included in the decrypted secret sentence according to a predetermined mnemonic rule.

* * * * *